(12) United States Patent  (10) Patent No.: US 8,954,467 B2
Christiansen  (45) Date of Patent: Feb. 10, 2015

(54) SYSTEMS AND METHODS FOR AUTOMATICALLY ASSOCIATING COMMUNICATION STREAMS WITH A FILE PRESENTED DURING A MEETING

(71) Applicant: Citrix Systems, Inc., Fort Lauderdale, FL (US)

(72) Inventor: Bernd Oliver Christiansen, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 15 days.

(21) Appl. No.: 13/688,960

(22) Filed: Nov. 29, 2012

(65) Prior Publication Data

US 2014/0149453 A1  May 29, 2014

(51) Int. Cl.
*G06F 17/30* (2006.01)
*G06Q 10/10* (2012.01)

(52) U.S. Cl.
CPC .......... *G06Q 10/10* (2013.01); *G06F 17/30056* (2013.01); *G06F 17/30165* (2013.01)
USPC ........... 707/769; 707/620; 709/206; 709/225; 715/734; 715/753; 370/261; 370/465; 726/1; 726/14

(58) Field of Classification Search
CPC ............ G06F 13/30176; G06F 21/604; G06F 17/30056; G06F 17/30165; G06F 21/72; G06F 21/629; H04L 63/20; H04L 29/00; H04L 29/08; H04L 29/06; H04L 67/10; H04L 65/403; H04L 41/00; H04L 51/08; G06Q 10/10; H04M 3/42

USPC .......... 707/620, 769; 715/734, 756, 753, 751, 715/781; 709/225, 223, 206, 204, 228, 213; 370/261, 260, 465; 726/1, 14
See application file for complete search history.

(56) References Cited

U.S. PATENT DOCUMENTS

| | | | | |
|---|---|---|---|---|
| 5,652,851 | A * | 7/1997 | Stone et al. | 715/804 |
| 6,058,428 | A * | 5/2000 | Wang et al. | 709/232 |
| 6,640,145 | B2 * | 10/2003 | Hoffberg et al. | 700/83 |
| 7,680,809 | B2 * | 3/2010 | Deng et al. | 707/706 |
| 7,761,510 | B2 | 7/2010 | Watanabe et al. | |
| 7,941,439 | B1 * | 5/2011 | Lawrence et al. | 707/769 |
| 8,418,075 | B2 * | 4/2013 | Gallo et al. | 715/767 |
| 2003/0110218 | A1 * | 6/2003 | Stanley | 709/204 |

(Continued)

OTHER PUBLICATIONS

Rob Barrett; Paul P. Maglio; and Daniel C. Kellem—"How to personalize the Web"—Published in: Proceeding CHI '97 Proceedings of the ACM SIGCHI Conference on Human factors in computing systems—pp. 75-82—ACM New York, NY, USA © 1997.*

(Continued)

*Primary Examiner* — Anh Ly
(74) *Attorney, Agent, or Firm* — BainwoodHuang

(57) ABSTRACT

Systems and method for sharing a file presented during a meeting are described. In some aspects, an operating system of a first client computing device of a presenter in an online meeting is monitored during the online meeting. The first client computing device of the presenter is engaged in screen sharing with a second client computing device of at least one other participant in the online meeting. That one or more files accessible via the operating system are being presented in the online meeting is determined based on the monitoring. The one or more files are provided to a set of users in response to determining that the one or more files are being presented in the online meeting.

16 Claims, 6 Drawing Sheets

(56) References Cited

U.S. PATENT DOCUMENTS

| | | | |
|---|---|---|---|
| 2003/0229900 A1* | 12/2003 | Reisman | 725/87 |
| 2007/0261102 A1* | 11/2007 | Spataro et al. | 726/2 |
| 2008/0005244 A1* | 1/2008 | Vernon et al. | 709/204 |
| 2009/0213205 A1 | 8/2009 | Ivashin | |
| 2009/0319672 A1* | 12/2009 | Reisman | 709/227 |
| 2010/0057845 A1* | 3/2010 | Thomas et al. | 709/203 |
| 2010/0332594 A1* | 12/2010 | Sundarrajan et al. | 709/203 |
| 2011/0022812 A1* | 1/2011 | van der Linden et al. | 711/163 |
| 2011/0249954 A1 | 10/2011 | Meek et al. | |
| 2011/0264745 A1* | 10/2011 | Ferlitsch | 709/205 |
| 2011/0267419 A1 | 11/2011 | Quinn et al. | |
| 2012/0321062 A1* | 12/2012 | Fitzsimmons et al. | 379/142.17 |
| 2013/0067526 A1* | 3/2013 | Reisman | 725/112 |
| 2013/0212067 A1* | 8/2013 | Piasecki et al. | 707/620 |
| 2014/0026181 A1* | 1/2014 | Kiang et al. | 726/1 |
| 2014/0149453 A1* | 5/2014 | Christiansen | 707/769 |

OTHER PUBLICATIONS

Pretschner, A. ; and Gauch, S.—"Ontology based personalized search"—Published in: Tools with Artificial Intelligence, 1999. Proceedings. 11th IEEE International Conference on—Date of Conference: 1999—pp. 391-398 Meeting Date : Nov. 9, 1999-Nov. 11, 1999.*

International Search Report and the Written Opinion dated May 9, 2014 from corresponding PCT Application No. PCT/US2013/064565.

* cited by examiner ns and methods for automatically associating communication streams with a file presented during a meeting

FIELD OF THE INVENTION

The subject technology relates generally to a communication technology. More specifically, the subject technology relates to sharing a file presented during a meeting.

BACKGROUND OF THE INVENTION

Oftentimes, a speaker in a meeting presents one or more files (e.g., a slide show, a set of photographs, or a word processing document) during the meeting. In an in-person meeting, printouts of the file(s) may be provided to the attendees of the meeting. In an online meeting, the file(s) may be provided to an electronic messaging (e.g., email) address of the attendees, requiring the presenter to manually select and send the file(s) to all attendees. Furthermore, the attendees need to separately access their electronic messaging accounts and figure out that the file(s) that they received should be associated with the online meeting that they attended.

SUMMARY OF THE INVENTION

In some aspects, a computer-implemented method for sharing a file presented during a meeting is provided. The method includes monitoring, during an online meeting, an operating system, a file system, a window manager or at least one application of a first client computing device of a presenter in the online meeting. The first client computing device of the presenter is engaged in screen sharing with a second client computing device of at least one other participant in the online meeting. The method includes determining, based on the monitoring, that one or more files accessible via the operating system are being presented in the online meeting. The method includes providing the one or more files to a set of users in response to determining that the one or more files are being presented in the online meeting.

In some aspects, a non-transitory computer-readable medium for sharing a file presented during a meeting is provided. The computer-readable medium includes instructions. The instructions include code for monitoring, during an online meeting, an operating system a file system, a window manager or at least one application of a first client computing device of a presenter in the online meeting. The first client computing device of the presenter is engaged in screen sharing with a second client computing device of at least one other participant in the online meeting. The instructions include code for determining, based on the monitoring, that one or more files accessible via the operating system are being presented in the online meeting. The instructions include code for providing the one or more files to a set of users in response to determining that the one or more files are being presented in the online meeting.

In some aspects, a system for sharing a file presented during a meeting is provided. The system includes one or more processors and a memory. The memory includes instructions. The instructions include code for monitoring, during an online meeting, an operating system a file system, a window manager or at least one application of a first client computing device of a presenter in the online meeting. The first client computing device of the presenter is engaged in screen sharing with a second client computing device of at least one other participant in the online meeting. The instructions include code for determining, based on the monitoring, that one or more files accessible via the operating system are being presented in the online meeting. The instructions include code for providing the one or more files to a set of users in response to determining that the one or more files are being presented in the online meeting.

In some aspects, a computer-implemented method for storing a file presented during a meeting is provided. The method includes receiving one or more files including one or more display items for presentation during a meeting. The method includes receiving a communication stream for the meeting. The method includes associating at least one of the one or more display items in the one or more files with a part of the communication steam. The part of the communication stream is communicated during presentation of the at least one of the one or more display items. The method includes storing, in a memory, the one or more files in conjunction with the communication stream. The at least one of the one or more display items in the one or more files is stored in association with the part of the communication stream.

In some aspects, a non-transitory computer-readable medium for storing a file presented during a meeting is provided. The computer-readable medium includes instructions. The instructions include code for receiving one or more files including one or more display items for presentation during a meeting. The instructions include code for receiving a communication stream for the meeting. The instructions include code for associating at least one of the one or more display items in the one or more files with a part of the communication steam. The part of the communication stream is communicated during presentation of the at least one of the one or more display items. The instructions include code for storing, in a memory, the one or more files in conjunction with the communication stream. The at least one of the one or more display items in the one or more files is stored in association with the part of the communication stream.

In some aspects, a system for storing a file presented during a meeting is provided. The system includes one or more processors and a memory. The memory includes instructions. The instructions include code for receiving one or more files including one or more display items for presentation during a meeting. The instructions include code for receiving a communication stream for the meeting. The instructions include code for associating at least one of the one or more display items in the one or more files with a part of the communication steam. The part of the communication stream is communicated during presentation of the at least one of the one or more display items. The instructions include code for storing the one or more files in conjunction with the communication stream. The at least one of the one or more display items in the one or more files is stored in association with the part of the communication stream.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

As set forth above, a new approach for storing file(s) presented during an online meeting or providing file(s) presented during an online meeting to attendee(s) of the online meeting may be desirable.

The subject technology provides techniques for storing a file presented during a meeting, for example, an online meeting. In some implementations, a server receives one or more files including one or more display items for presentation during a meeting. For example, a presenter of the meeting may store the one or more files in a workspace associated with the meeting that is coupled with the server. During the meeting, the server receives a communication stream for the meeting. The communication stream can include a video stream, an audio stream, or one or more text messages. When a display item in the file(s) is displayed, the server associates the portion of the communication stream that is communicated during the presentation of the display item with the display item. After the meeting, the file(s) are stored in conjunction with the communication stream. Display item(s) in the file(s) that were presented during the meeting are stored in association with the part of the communication stream that was communicated during the presentation.

Advantageously, the subject technology allows a user accessing a workspace of an online meeting to easily associate parts of the communication stream with presented data, and vice versa. For example, if a slide show is presented during a meeting with an audio communication stream, a user can search for text in the slides and quickly locate the corresponding audio of the meeting, or the user can search for text in a transcription of the audio of the meeting and view slide(s) corresponding to the search result(s).

Figure 1:
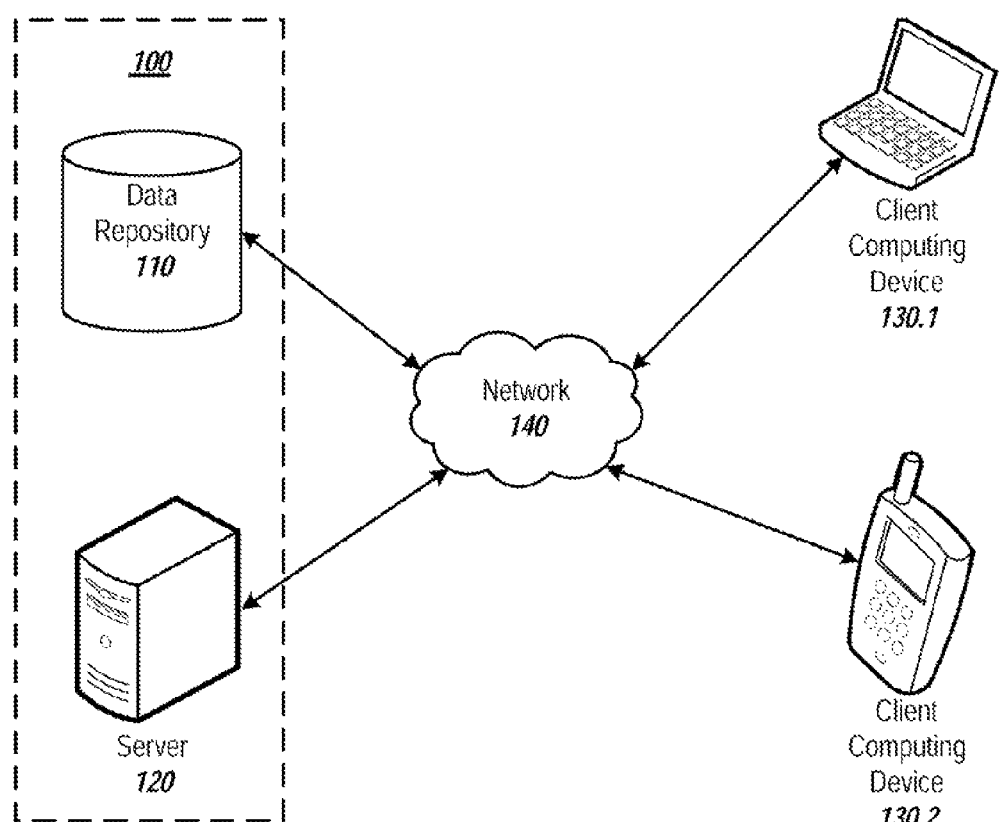
FIG. 1 illustrates an exemplary system for storing a file presented during a meeting.

FIG. 1 illustrates an exemplary system 100 for storing a file presented during a meeting. As shown, the system 100 includes a data repository 110 and a server 120. The data repository 110 and the server 120 communicate with one another and with client computing devices 130.1-2 via a network 140. The network 140 may include the Internet, an intranet, a local area network, a wide area network, a wired network, a wireless network, or a virtual private network (VPN). While only one data repository 110, one server 120, and two client computing devices 130.1-2 are illustrated, the subject technology may be implemented in conjunction with any number of data repositories 110, servers 120, or client computing devices 130. In some aspects, a single machine may implement the functions of two or more of the data repository 110, the server 120, or the client computing devices 130.

The data repository 110 stores content related to meetings. For example, the data repository 110 can include one or more meeting workspaces that include data related to the meeting. One example of the data repository 110 is described in more detail in conjunction with FIG. 2 below.

The server 120 includes one or more modules for implementing an online meeting including two or more participants, who access the meeting via client computing devices 130, for example, via a browser or a special purpose application executing on the client computing device 130. The server 120 may be implemented as a single machine with a single processor, a multi-processor machine, or a server farm including multiple machines with multiple processors. One example of the server 120 is described in more detail in conjunction with FIG. 3 below.

Each client computing device 130 may be a laptop computer, a desktop computer, a mobile phone, a personal digital assistant (PDA), a tablet computer, a netbook, a television with one or more processors embedded therein or coupled thereto, a physical machine, or a virtual machine. Each client computing device 130 may include one or more of a keyboard, a mouse, a display, or a touch screen. Each client computing device 130 may also include a web browser configured to display webpages, for example a webpage of an online meeting service. Alternatively, the client computing device 130 may include a special-purpose application (e.g., a mobile phone or tablet computer application) for accessing the online meeting service.

Figure 2:
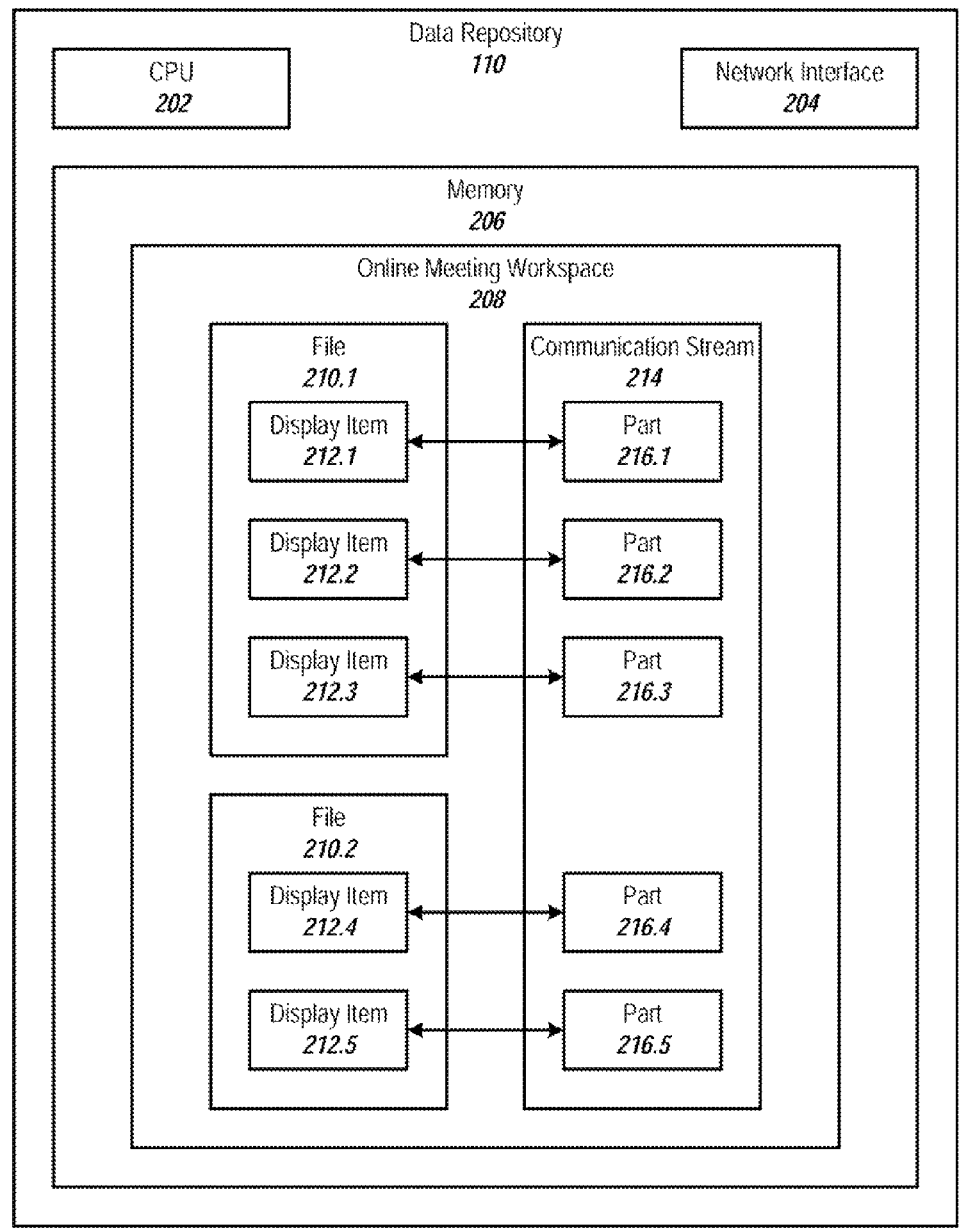
FIG. 2 illustrates an exemplary data repository of FIG. 1.

FIG. 2 illustrates an exemplary data repository 110 of FIG. 1. As shown, the data repository 110 includes a central processing unit (CPU) 202, a network interface 204, and a memory 206. The CPU 202 includes one or more processors. The CPU 202 is configured to execute computer instructions that are stored in a computer-readable medium, for example, the memory 206. The network interface 204 is configured to allow the data repository 110 to transmit and receive data in a network, e.g., network 140 of FIG. 1. The network interface 204 may include one or more network interface cards (NICs). The memory 206 stores data or instructions. The memory 206 may be one or more of a cache unit, a storage unit, an internal memory unit, or an external memory unit. As illustrated, the memory 206 includes an online meeting workspace 208. While a single online meeting workspace 208 is shown in FIG. 2, the memory 206 can include multiple online meeting workspaces 208.

The online meeting workspace 208 includes information associated with an online meeting. As used herein, the phrase "online meeting" encompasses its plain and ordinary meaning including but not limited to a meeting between two or more client computing device (e.g., client computing devices 130.1-2) connected to one another and to an online meeting service (e.g., data repository 110 and server 120) via a network (e.g., network 140). As shown, the online meeting workspace 208 stores files 210.1-2 and a communication stream 214. While the subject technology is illustrated in FIG. 2 in conjunction with two files 210, the subject technology may be implemented with any number of files 210.

The files 210.1-2 correspond to files presented during the online meeting. The files 210.1-2 can include one or more of a slide show, a word processing document, an album of images. Each file 210.1-2 can include one or more display items 212.1-5. For example, if the file represents a slide show, a display item in the file can be a slide in the slide show. If the file represents a word processing document, a display item in the file can be a page in the word processing document. If the file is an album of images, the display item can be an individual image in the album of images. In some cases, a file can include no display items. As illustrated, file 210.1 includes display items 212.1-3 and file 210.2 includes display items 212.4-5. Each display item 212.$k$ is associated with a part 216.$k$ of the communication stream 214 that was communicated while the display item 212.$k$ was being presented in the online meeting. In some cases, a display item may not be presented during the online meeting or may be presented while nothing is communicated. In such cases, the display item may not be associated with a part 216.$k$ of the communication stream 214 or may be associated with an empty or null part 216.$k$ of the communication stream 214.

The communication stream 214 can be one or more of an audio stream, a video stream, a transcription of an audio or video stream, or one or more text messages (e.g., if the online meeting is conducted via a text chatting program). Each part 216.$k$ of the communication stream corresponds to information that was communicated while an associated display item 212.$k$ was being presented. Some portions of the communication stream 214 may not correspond to any part 216.$k$ of the communication stream, for example, portions communicated while a file 210 was not being presented.

Figure 3:
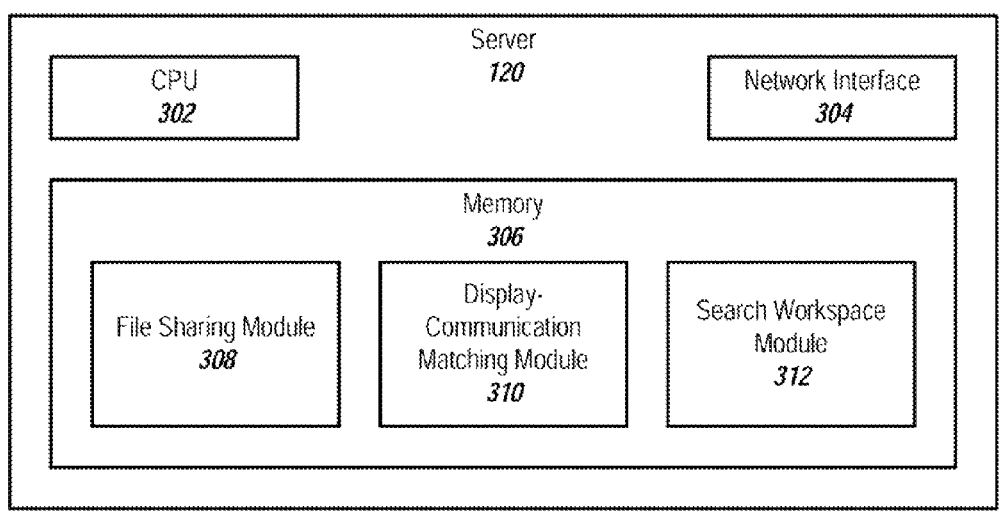
FIG. 3 illustrates an exemplary server of FIG. 1.

FIG. 3 illustrates an exemplary server 120 of FIG. 1. As shown, the server 120 includes a central processing unit (CPU) 302, a network interface 304, and a memory 306. The CPU 302 includes one or more processors. The CPU 302 is configured to execute computer instructions that are stored in a computer-readable medium, for example, the memory 306. The network interface 304 is configured to allow the data repository 110 to transmit and receive data in a network, e.g., network 140 of FIG. 1. The network interface 304 may include one or more network interface cards (NICs). The memory 306 stores data or instructions. The memory 306 may be one or more of a cache unit, a storage unit, an internal memory unit, or an external memory unit. As illustrated, the memory 306 includes a file sharing module 308 a display-communication matching module 310 and a search workspace module 312.

The file sharing module 308 is configured to monitor, during an online meeting, an operating system of a first client computing device of a presenter in the online meeting (e.g., a first one of the client computing devices 130). The first client computing device of the presenter is engaged in screen sharing with a second client computing device of at least one participant in the online meeting (e.g., a second one of the client computing devices 130). The file sharing module 308 is configured to determine, based on the monitoring of the operating system, that one or more files accessible via the operating system are being presented in the online meeting. The file sharing module 308 is configured to provide the one or more files to a set of users in response to determining that the one or more files are being presented in the online meeting, upon receiving permission from the first client computing device of the presenter. The set of users can include, for example, a set of attendees at the online meeting or others interested in the online meeting. The one or more files may be provided to the set of users, for example, via an electronic message (e.g., email) or via a message transmitted within an application (e.g., a browser or a special purpose application) for accessing the online meeting.

The display-communication matching module 310 is configured to receive one or more files (e.g., files 210.1-2) including one or more display items (e.g., display items 212.1-5) for presentation during a meeting. The display-communication matching module 310 is configured to receive a communication stream (e.g., communication stream 214) for the meeting. The display-communication matching module is configured to associate one of the one or more display items (e.g., display item 212.1) in the one or more files with part (e.g., part 216.1) of the communication stream. The part of the communication stream is communicated during presentation of the one of the one or more display items. In some aspects, at least one display item (e.g., two display items, three display items, or four or more display items) may be used instead of one display item. The display-communication matching module 310 is configured to store, in a memory (e.g., memory 206 of data repository 110), the one or more files in conjunction with the communication stream. The one of the one or more display items in the one or more files is stored in association with the part of the communication stream.

The search workspace module 312 is configured to search a workspace (e.g., online meeting workspace 208) after an online meeting has been conducted. According to some aspects, the search workspace module 312 receives a search query (e.g., a text search query) for the one or more files (e.g., files 210) stored in conjunction with the communication stream (e.g., communication stream 214). The search workspace module 312 searches the one or more files and the communication stream based on the search query to generate one or more search results. At least one of the one or more search results is associated with a display item (e.g., one of display items 212) in the one or more files and an associated part (e.g., parts 216) of the communication stream. For example, if the search query corresponds to the phrase "hello world," one of the search results could correspond to a place (e.g., a part of the communication stream or a display item in the file(s)) where "hello world" is either spoken or written in the communication stream or is written in the one or more files. The search workspace module 312 provides for presentation (e.g., via a client computing device 130) of the display item in the one or more files and the associated part of the communication stream of the search result(s) associated with the display item or the part of the communication stream.

Advantageously, as a result of the operation of the search workspace module 312, a user searching for information in an online meeting workspace (e.g., online meeting workspace 208) can locate relevant information in files from a meeting and access the associated parts of the communication stream to obtain additional information. Alternatively, the user can locate relevant information in the communication stream and easily access the files containing information that was displayed while the relevant information was being communicated (e.g., typed or spoken).

Figure 4:
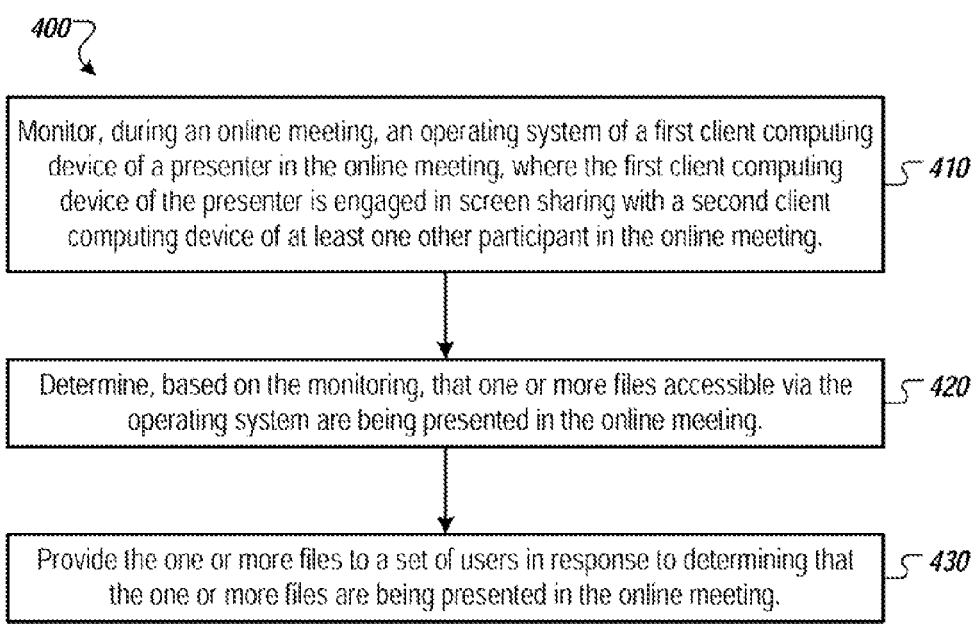
FIG. 4 illustrates an exemplary process for sharing a file presented during an online meeting.

FIG. 4 illustrates an exemplary process 400 for sharing a file presented during an online meeting.

The process 400 begins at step 410, where a server (e.g., server 120) monitors, during an online meeting, an operating system of a first client computing device (e.g., one of the client computing devices 130) of a presenter in the online meeting. The first client computing device of the presenter is engaged in screen sharing with a second client computing device of at least one other participant in the online meeting. Monitoring the operating system of the first client computing device of the presenter in the online meeting can include observing read operations at the file system level of the operating system, as reading a file is necessary for opening the file. Monitoring the operating system of the first client computing device of the presenter in the online meeting can include observing temporary files being created at the file system level of the operating system, as temporary files may be created when a program (e.g., a word processing program) is used to open a file or temporarily save changes to the opened file. Monitoring the operating system of the first client computing device of the presenter in the online meeting can include observing a list of recently opened files being created at the file system level of the operating system. Monitoring the operating system of the first client computing device of the presenter in the online meeting can include monitoring one or more active processes of the operating system and determining, via an automation interface, the one or more files being accessed for display by the one or more active processes. As used herein, the phrase "automation interface" encompasses its plain and ordinary meaning including, but not limited to, an inter-process communication interface or an interface for one process running on a computer to communicate with another process running on the same computer or on a different computer. Monitoring the operating system of the first client computing device of the presenter in the online meeting can include determining that the operating system of the first client computing device of the presenter is downloading, via a network (e.g., network 140), the one or more files for display. The one or more files can reside on one or more storage servers.

In step 420, the server determines, based on the monitoring of step 410, that one or more files accessible via the operating system (e.g., files stored in the operating system or files accessible via an application (e.g., a browser) executing within the operating system) are being presented in the online meeting.

In step 430, the server provides the one or more files to a set of users in response to determining that the one or more files are being presented in the online meeting. A user of the first client computing device of the presenter provides permission, via the first client computing device, for the one or more files to be provided to the set of users before the one or more files are provided to the set of users. The set of user can include a set of participants in the online meeting, either including or excluding the presenter. The set of users can also include other users, for example, users who are interested in the subject matter of the online meeting but could not attend. In some aspects, the one or more files can be stored on a server (e.g., the server implementing the process 400, server 120, or a different server) or a data repository (e.g., data repository 110 or a different data repository). The server can provide, via an electronic message (e.g., email or a messaging program within the online meeting), one or more links to the one or more files stored in the server or in the data repository to the set of users. After step 430, the process 400 ends.

Figure 5:
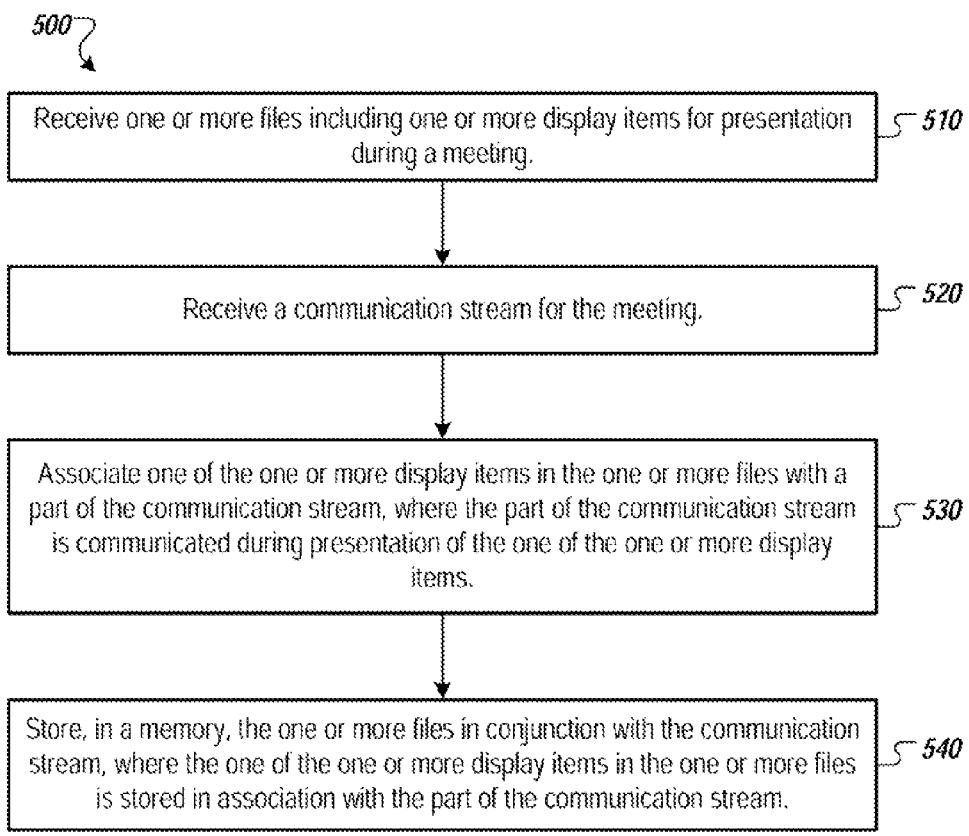
FIG. 5 illustrates an exemplary process for storing a file presented during a meeting.

FIG. 5 illustrates an exemplary process 500 for storing a file presented during a meeting.

The process 500 begins at step 510, where a server (e.g., server 120) receives (e.g., from a client computing device 130) one or more files (e.g., files 210) including one or more display items (e.g., display items 212) for presentation during a meeting. The one or more files can be received using all or a portion of the process 400 of FIG. 4. For example, a user of a client computing device can upload the one or more files to a workspace for the meeting (e.g., online meeting workspace 208).

In step 520, the server receives a communication stream (e.g., communication stream 214) for the meeting. The communication stream can be transmitted to the server via a network (e.g., network 140) which can include the Internet, an intranet, a virtual private network (VPN), a local network, a telephone network, or a cellular network. During the communication stream, one or more of the display items in the one or more files may be presented to attendees of the meeting.

In step 530, the server associates one of the one or more display items in the one or more files with a part of the communication stream. In some examples, a client computing device (e.g., of a presenter or other attendee in an online meeting) associates the one or more display items in the one or more files with the part of the communication stream and notify the server of the association. In some examples, the association is determined locally at the server. The part of the communication stream is communicated during presentation of the one or more display items. For example, a display item can correspond to a slide, and the part of the communication stream can be the part of the communication stream that was communicated while the slide was being presented. In some aspects, the start time and the end time, in the communication stream, of the presentation of the slide can be stored. In some aspects, more than one of the display items can be associated with parts of the communication stream. For example, if multiple slides are presented, each slide can be associated with its own part of the communication stream.

In some aspects, the server associates the one of the one or more display items in the one or more files with the part of the communication stream by receiving, during the meeting, an indication that the part of the communication stream is being communicated and determining, via an automation interface, the one of the one or more display items that is being presented.

In some aspects, the server associates the one of the one or more display items in the one or more files with the part of the communication stream by injecting, into the one of the one or more display items, a link to the part of the communication stream. As a result, the one of the one or more display items is coupled with the part of the communication stream.

In step 540, the server stores, in a memory (e.g., a local memory of the server or a data repository coupled with the server), the one or more files in conjunction with the communication stream. The one of the one or more display items is stored in association with the part of the communication stream that was communicated during presentation of the one of the one or more display items. In some aspects, the one or more files are stored in conjunction with the communication stream within a workspace (e.g., online meeting workspace 208). The workspace is accessible to at least one participant in the meeting or to each participant in the meeting, for example, if the participant provides his/her login information to access the workspace. The workspace may be accessible, for example, via a webpage or via a special purpose application executing on a desktop computer, laptop computer, tablet computer, or mobile device. In some aspects, the server can provide an electronic message (e.g., email) to at least one participant in the meeting or each participant in the meeting whose electronic messaging address is available. The electronic message can include an attachment of the one or more files stored in conjunction with the communication stream.

In some aspects, the server can receive a request for access to the one of the one or more display items. In response to the request for access to the one of the one or more display items, the server provides the one of the one or more display items in conjunction with the link to the part of the communication stream that was injected into the one of the one or more display items. As a result, a user is able to access the part of the communication stream (e.g., the audio recording) that is associated with the display item (e.g., slide) that the user is viewing. After step 540, the process 500 ends.

The steps 410-430 of the process 400 and 510-540 of the process 500 are described herein as being carried out in series in a specified order. However, the steps of the processes 400 and 500 can be carried out in any order. In some aspects, two or more steps of either process 400 or 500 may be carried out in parallel.

Some aspects of the subject technology are described herein with reference to an online meeting. However, the subject technology may be implemented in conjunction with any type of meeting, for example, a conference call, a teleconference accessed by telephone, a video conference, etc., not necessarily an online meeting.

Figure 6:
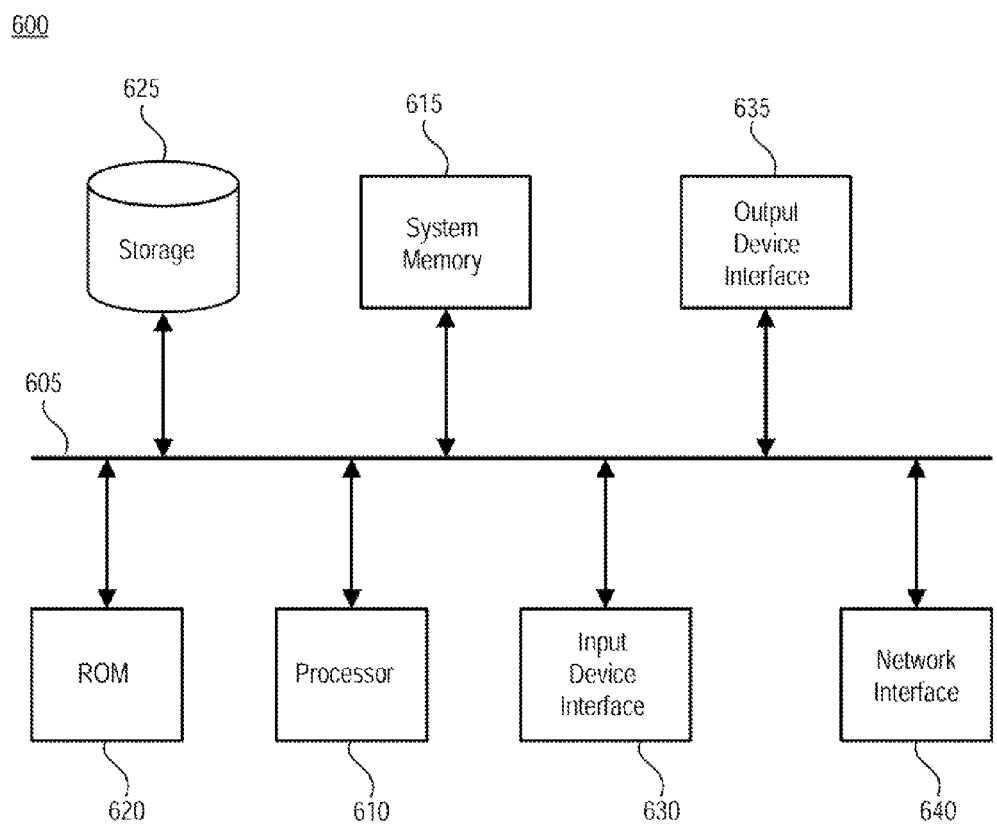
FIG. 6 conceptually illustrates an exemplary electronic system with which some implementations of the subject technology are implemented.

FIG. 6 conceptually illustrates an electronic system 600 with which some implementations of the subject technology are implemented. For example, one or more of the data repository 110, the server 120, or the client computing devices 130.1-2 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for sharing a file presented during a meeting in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touch screen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The invention claimed is:

1. A computer-implemented method for storing a file presented during a meeting, the method comprising:
    receiving one or more files comprising one or more display items for presentation during a meeting, wherein the one or more files comprise an album of images, and wherein the one or more display items comprise one or more individual images in the album of images;
    receiving an audio communication stream for the meeting;
    associating at least one of the one or more display items in the one or more files with a part of the audio communication steam, wherein the part of the audio communication stream is communicated during presentation of the at least one of the one or more display items;
    storing a start time and an end time of the part of the audio communication stream, the start time and the end time of the part of the audio communication stream corresponding a beginning and an ending of presentation of the at least one of the one or more display items; and
    storing, in a memory, the one or more files in conjunction with the audio communication stream, wherein the at least one of the one or more display items comprises a link for accessing the part of the audio communication stream between the start time and the end time.

2. The method of claim 1, wherein the one or more files comprise a slide show, and wherein the one or more display items comprise one or more slides in the slide show.

3. The method of claim 1, wherein the one or more files comprise a word processing document, and wherein the one or more display items comprise one or more pages in the word processing document.

4. The method of claim 1, wherein the one or more files are stored in conjunction with the communication stream reside in a workspace, and wherein the workspace is accessible to at least one participant in the meeting.

5. The method of claim 1, further comprising:
providing an electronic message to at least one participant in the meeting, the electronic message comprising an attachment of the one or more files stored in conjunction with the communication stream.

6. The method of claim 1, further comprising:
receiving a search query for the one or more files stored in conjunction with the communication stream;
searching the one or more files and the communication stream based on the search query to generate one or more search results, at least one of the one or more search results being associated with a display item in the one or more files and an associated part of the audio communication stream; and
providing for presentation of the display item in the one or more files and the associated part of the audio communication stream of the at least one of the one or more search results.

7. The method of claim 1, wherein associating the at least one of the one or more display items in the one or more files with the part of the audio communication steam comprises:
receiving an indication that the part of the audio communication stream is being communicated; and
determining, via an automation interface, the at least one of the one or more display items that is being presented.

8. The method of claim 1, wherein associating the at least one of the one or more display items in the one or more files with the part of the audio communication steam comprises:
injecting, into the at least one of the one or more display items, the link for accessing the part of the audio communication stream.

9. The method of claim 8, further comprising:
receiving a request for access to the at least one of the one or more display items;
providing, in response to the request for access to the at least one of the one or more display items, the at least one of the one or more display items in conjunction with the link for accessing the part of the audio communication stream.

10. A non-transitory computer-readable medium for storing a file presented during a meeting, the computer-readable medium comprising instructions which, when executed by one or more computers, cause the one or more computers to implement a method, the method comprising:
receiving one or more files comprising one or more display items for presentation during a meeting;
receiving an audio communication stream for the meeting;
associating at least one of the one or more display items in the one or more files with a part of the audio communication steam, wherein the part of the audio communication stream is communicated during presentation of the at least one of the one or more display items;
storing a start time and an end time of the part of the audio communication stream, the start time and the end time of the part of the audio communication stream corresponding a beginning and an ending of presentation of the at least one of the one or more display items;
storing, in a memory, the one or more files in conjunction with the audio communication stream, wherein the at least one of the one or more display items comprises a link for accessing the part of the audio communication stream between the start time and the end time; and
providing an electronic message to at least one participant in the meeting, the electronic message comprising an attachment of the one or more files stored in conjunction with the communication stream.

11. The computer-readable medium of claim 10, wherein the one or more files comprise a slide show, and wherein the one or more display items comprise one or more slides in the slide show.

12. The computer-readable medium of claim 10, wherein the one or more files comprise a word processing document, and wherein the one or more display items comprise one or more pages in the word processing document.

13. The computer-readable medium of claim 10, wherein the one or more files comprise an album of images, and wherein the one or more display items comprise one or more individual images in the album of images.

14. The computer-readable medium of claim 10, wherein the one or more files are stored in conjunction with the communication stream reside in a workspace, and wherein the workspace is accessible to at least one participant in the meeting.

15. The computer-readable medium of claim 10, the method further comprising:
receiving a search query for the one or more files stored in conjunction with the communication stream;
searching the one or more files and the communication stream based on the search query to generate one or more search results, at least one of the one or more search results being associated with a display item in the one or more files and an associated part of the audio communication stream; and
providing for presentation of the display item in the one or more files and the associated part of the audio communication stream of the at least one of the one or more search results.

16. A system for storing a file presented during a meeting, the system comprising:
one or more processors; and
a memory comprising instructions which, when implemented by the one or more processors, cause the one or more processors to implement a method, the method comprising:
receiving one or more files comprising one or more display items for presentation during a meeting, wherein the one or more files comprise an album of images, and wherein the one or more display items comprise one or more individual images in the album of images;
receiving an audio communication stream for the meeting;
associating at least one of the one or more display items in the one or more files with a part of the audio communication steam, wherein the part of the audio communication stream is communicated during presentation of the at least one of the one or more display items;
storing a start time and an end time of the part of the audio communication stream, the start time and the end time of the part of the audio communication stream corresponding a beginning and an ending of presentation of the at least one of the one or more display items; and storing the one or more files in conjunction with the audio communication stream, wherein the at least one of the one or more display items comprises a link for accessing the part of the audio communication stream between the start time and the end time.

\* \* \* \* \*